United States Patent
Moon et al.

(10) Patent No.: US 11,265,972 B2
(45) Date of Patent: Mar. 1, 2022

(54) SUPPORT STRUCTURE FOR OBJECT TO BE HEATED

(71) Applicant: LG Electronics Inc., Seoul (KR)

(72) Inventors: Hyunwook Moon, Seoul (KR); Eui Sung Kim, Seoul (KR); Byungkyu Park, Seoul (KR); Jae-Woo Lee, Seoul (KR)

(73) Assignee: LG Electronics Inc., Seoul (KR)

( * ) Notice: Subject to any disclaimer, the term of this patent is extended or adjusted under 35 U.S.C. 154(b) by 361 days.

(21) Appl. No.: 16/145,403

(22) Filed: Sep. 28, 2018

(65) Prior Publication Data
US 2019/0104570 A1   Apr. 4, 2019

(30) Foreign Application Priority Data
Sep. 29, 2017   (KR) .......................... 10-2017-0128282

(51) Int. Cl.
*H05B 6/06* (2006.01)
*H02J 50/10* (2016.01)
(Continued)

(52) U.S. Cl.
CPC .............. *H05B 6/062* (2013.01); *H02J 50/10* (2016.02); *H05B 6/1227* (2013.01);
(Continued)

(58) Field of Classification Search
CPC ...... H05B 6/062; H05B 6/065; H05B 6/1281; H05B 6/1227; H05B 6/1236;
(Continued)

(56) References Cited

U.S. PATENT DOCUMENTS 6,891,133 B2 * 5/2005 Shozo .................... F24C 7/06
                                                          219/386
2007/0125768 A1 * 6/2007 Kim ...................... H05B 6/062
                                                          219/626
(Continued)

FOREIGN PATENT DOCUMENTS

CN        104869678 B  *  4/2017
DE        102010020189     1/2011
(Continued)

OTHER PUBLICATIONS

English translation of CN-104869678-B (Year: 2017).*
(Continued)

*Primary Examiner* — Ibrahime A Abraham
*Assistant Examiner* — Chris Q Liu
(74) *Attorney, Agent, or Firm* — Fish & Richardson P.C.

(57) ABSTRACT

Disclosed is a support structure for an induction heating device that includes a working coil configured to heat an object. The support structure includes: a housing including an upper surface that is recessed do inward and that is configured to seat the object; a repeating coil that is located inside of the housing, that is configured to generate magnetic induction or magnetic resonance with the working coil, and that is configured to heat the object on the upper surface of the housing based on magnetic induction or magnetic resonance with the working coil; and a compensation capacitor located inside of the housing and connected to the repeating coil, where the compensation capacitor is configured to control output of the repeating coil.

20 Claims, 6 Drawing Sheets

(51) Int. Cl.
*H05B 6/36* (2006.01)
*H05B 6/12* (2006.01)

(52) U.S. Cl.
CPC ......... *H05B 6/1236* (2013.01); *H05B 6/1272* (2013.01); *H05B 6/362* (2013.01)

(58) Field of Classification Search
CPC ...... H05B 6/1209; H05B 6/1272; H05B 6/12; H05B 6/1245; H05B 6/1263; H05B 6/105; H05B 6/06; H05B 6/1254; H05B 6/36; H05B 6/362
USPC .......... 219/622, 624, 623, 386, 403, 452.12, 219/543, 600, 621, 625, 626, 649, 665, 219/671, 674, 675; 99/358, 422, 451
See application file for complete search history.

(56) References Cited

U.S. PATENT DOCUMENTS

2009/0194526 A1* 8/2009 Buchanan .............. H05B 6/062
219/600
2013/0098902 A1* 4/2013 Hoffmann ................ H05B 6/12
219/622
2015/0163864 A1* 6/2015 Baarman ................ H02J 5/005
99/358
2016/0014849 A1* 1/2016 Hegedis ............... H05B 6/1272
219/627

FOREIGN PATENT DOCUMENTS

| | | |
|---|---|---|
| EP | 2408261 | 1/2012 |
| JP | H06338382 | 12/1994 |
| WO | WO2013103939 | 7/2013 |

OTHER PUBLICATIONS

English translation of JPH06338382A (Year: 1994).*
Extended European Search Report in European Appln. No. 18196543.5, dated Mar. 4, 2019, 8 pages.

* cited by examiner

RELATED ART

RELATED ART

SUPPORT STRUCTURE FOR OBJECT TO BE HEATED

CROSS-REFERENCE TO RELATED APPLICATION

This application claims priority to and the benefit of Korean Patent Application No. 10-2017-0128282, filed on Sep. 29, 2017, the disclosure of which is incorporated herein by reference in its entirety.

FIELD

This application relates to a support structure that is configured to be driven by a working coil provided in an induction heating device to heat an object.

BACKGROUND

Cooking devices may use various methods to heat food. For example, a gas range uses gas as fuel. In some examples, cooking devices may heat an object such as a cooking vessel or a pot, for example, using electricity without using gas.

A method of heating an object using electricity may be divided into a resistive heating method and an induction heating method. In the electrical resistive method, heat may be generated based on current flowing through a non-metallic heating element such as silicon carbide or a metal resistance wire. In this method, heat may be transmitted to the object through a radiation or conduction to heat the object. In the induction heating method, an eddy current may be generated in the object made of metal based on a high-frequency power of a predetermined magnitude applied to the coil. In this method, the loaded object may be heated by the eddy current generated based on magnetic field around the working coil.

An induction heating device is a heating device that uses the induction heating method.

In some cases, the induction heating device may include a flat top plate. In such cases, it may be difficult to heat an object such as a wok that has a concave lower surface. In some cases, a large resonance current may be necessary to heat the object.

FIG. 1 is a schematic view explaining an example of an induction heating device in related art. FIG. 2 is a schematic view explaining another example of an induction heating device in related art.

In the example shown in FIG. 1, a top plate TB1 of an induction heating device 10 is concavely formed in a wok shape to heat an object such as a wok.

In some cases, when other cooking vessels having a flat shape are to be heated, a cup-shaped jig 20 that has a concave lower surface may provide a top plate TB2. The cup-shaped jig 20 may include repeating coils MC1 and MC2.

In some cases, the jig 20 may have a considerable size and weight, which may cause inconvenience for storage and transportation of the jig 20. The jig 20 does not include a capacitor in the jig 20, which may make it difficult to heat various cooking vessels as intended.

In the example shown in FIG. 2, an induction heating device 30 may be used to heat an object placed on a flat top plate TB without a support structure 40. In the case of heating an object such as a wok, the support structure 40 may be placed on the top plate TB. The support structure 40 may include repeating coils MC1 and MC2 inside thereof.

In some cases, a heating efficiency of the support structure 40 may be degraded due to the distance between the object and the working coil WC in the induction heating device 30 and due to a resonance point change of the repeating coils MC1 and MC2 inside of the support structure 40. The support structure 40 does not include a capacitor in the support structure 40, which may make it difficult to heat various cooking vessels as intended.

SUMMARY

One object of this application is to provide a support structure of an object to be heated that efficiently transmits an output of an induction heating device to the object.

Another object of this application is to provide a support structure of an object to be heated that improves a temperature control efficiency of the object through an associated driving with an induction heating device.

The objects of this application are not limited to the above-mentioned objects, and the other objects and the advantages of this application, which are not mentioned, can be understood by the following description, and more clearly understood by the implementations of this application. It will be also readily seen that the objects and the advantages of this application may be realized by means indicated in the patent claims and a combination thereof.

According to one aspect of the subject matter described in this application, a support structure is disclosed for an induction heating device that includes a working coil configured to heat an object. The support structure includes: a housing including an upper surface that is recessed downward and that is configured to seat the object; a repeating coil that is located inside of the housing, that is configured to generate magnetic induction or magnetic resonance with the working coil, and that is configured to heat the object on the upper surface of the housing based on magnetic induction or magnetic resonance with the working coil; and a compensation capacitor located inside of the housing and connected to the repeating coil, where the compensation capacitor is configured to control output of the repeating coil.

Implementations according to this aspect may include one or more of the following features. For example, the repeating coil may be arranged vertically between the working coil and a lowermost end of the object. In some examples where the induction heating device further includes a resonance capacitor connected to the working coil, a capacitance value of the compensation capacitor may be less than half of a capacitance value of the resonance capacitor. In some examples, the support structure may further include a temperature sensor located inside of the housing and configured to sense a temperature of the object on the upper surface of the housing, and a communication module that is configured to wirelessly communicate with the temperature sensor and the induction heating device, that is configured to receive information regarding the temperature of the object from the temperature sensor, and that is configured to provide the information to the induction heating device.

In some examples, the temperature sensor may be arranged at a central region of the housing, and the housing may further include a lower surface that is spaced apart from the upper surface, where a distance between the upper surface and the lower surface of the housing decreases toward the central region of the housing. In some examples, the repeating coil is configured to supply, to the temperature sensor and to the communication module, power generated through the magnetic induction or the magnetic resonance with the working coil.

In some implementations, the upper surface of the housing includes a first horizontal portion that extends in a horizontal direction with respect to a lower surface of the housing, a curved surface portion that has a first end connected to an end of the first horizontal portion and that is curved downward to the lower surface of the housing, a vertical portion that extends from a second end of the curved surface portion in a vertical direction with respect to the lower surface of the housing, and a second horizontal portion that extends from an end of the vertical portion in the horizontal direction with respect to the lower surface of the housing.

In some examples, the support structure may further include a temperature sensor that is configured to sense a temperature of the object on the upper surface of the housing. The temperature sensor and the repeating coil may be arranged between the second horizontal portion and the lower surface of the housing. The temperature sensor is provided at a central region inside of the housing and is spaced apart from the repeating coil by a predetermined distance in a radial direction of the repeating coil.

In some examples, at least a portion of the second horizontal portion is configured to be spaced apart from the object in a state in which the curved surface portion contacts a bottom surface of the object. In some examples, a vertical distance between the first end of the curved surface portion and the second end of the curved surface portion is greater than a vertical distance between the second end of the curved surface portion and the second horizontal portion.

In some implementations, the upper surface of the housing has a concave shape. In some examples, the repeating coil is located vertically above the working coil. The upper surface of the housing may be configured to contact a lowermost end of the object vertically above the repeating coil. In some examples, the temperature sensor is arranged at the central region of the housing at a position that defines a minimum distance between the upper surface and the lower surface of the housing. In some examples, the repeating coil is arranged radially outward of the temperature sensor.

In some implementations, the housing further includes a lower surface that has a planar shape and that is configured to contact a top plate of the induction heating device, the top plate being located vertically above the working coil. In some examples, the repeating coil is located in a space defined between the upper surface of the housing and the lower surface of the housing, The compensation capacitor may be located in the space defined between the upper surface of the housing and the lower surface of the housing. The compensation capacitor may be located radially outward of the repeating coil.

In some implementations, the support structure may further include a temperature sensor that is located in the space defined between the upper surface of the housing and the lower surface of the housing, where the temperature sensor is configured to sense a temperature of the object on the upper surface of the housing, and a communication module that is located in the space defined between the upper surface of the housing and the lower surface of the housing, where the communication module is configured to receive information regarding the temperature of the object from the temperature sensor and to provide the information to the induction heating device. The repeating coil may be arranged radially outward of the temperature sensor, and the communication module may be arranged radially outward of the repeating coil.

The support structure may efficiently transmit the output of the induction heating device to an object such as a wok. Accordingly, the user can heat an object in a special shape such as a wok as well as other cooking vessels as intended, and furthermore, it is possible to shorten the cooking time when cooking by using the object to be heated such as the wok.

Further, the support structure may improve the temperature control efficiency of the object through the associated driving with the induction heating device. In some examples, a fixed temperature control may be possible to cook using the object, which may improve a taste of cooking.

Hereafter, a specific effect of this application, in addition to the above-mentioned effect, will be described together while describing a specific matter for implementing this application.

DETAILED DESCRIPTION

Figure 1:
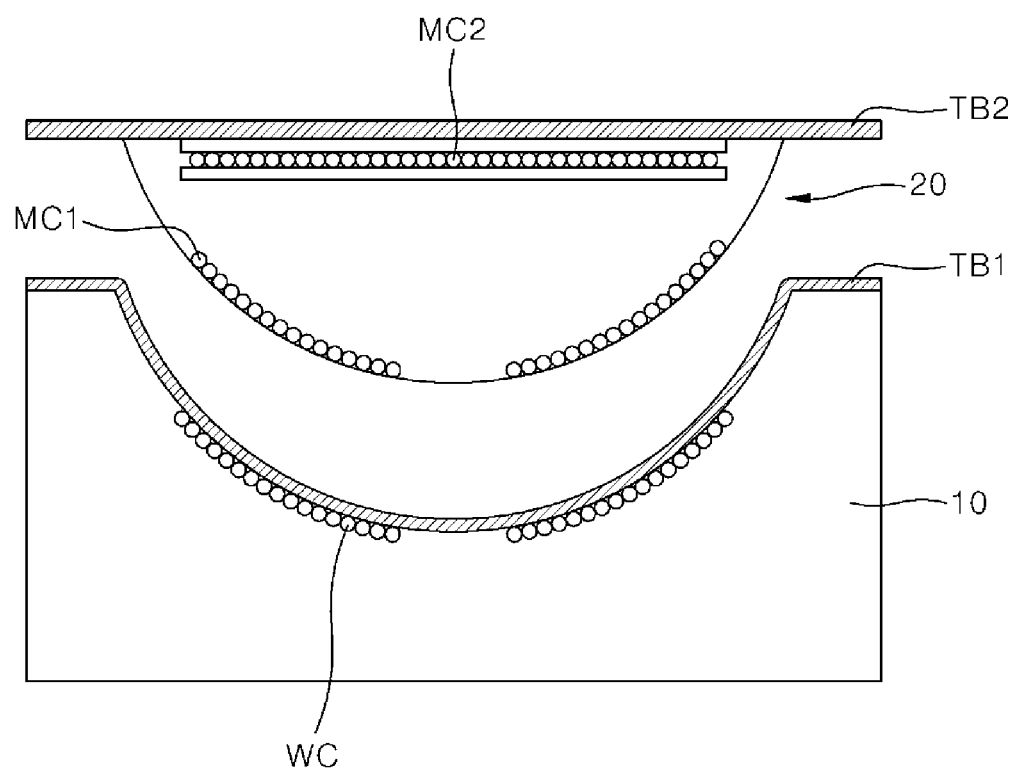
FIG. 1 is a schematic view explaining an example of an induction heating device in related art.
Figure 2:
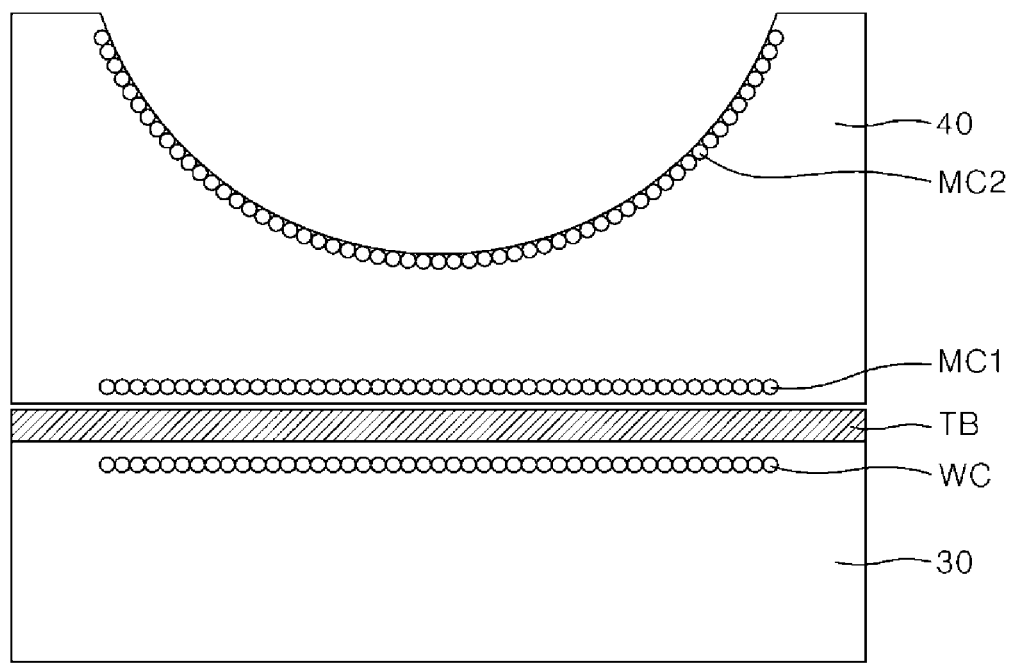
FIG. 2 is a schematic view explaining another example of an induction heating device in related art.

Hereinafter, the example implementations of this application will be described in detail with reference to the accompanying drawings. In the drawings, the like reference numerals are used to indicate the same or similar components.

Hereinafter, a support structure for an object in accordance with an exemplary implementation of this application will be described.

Figure 3:
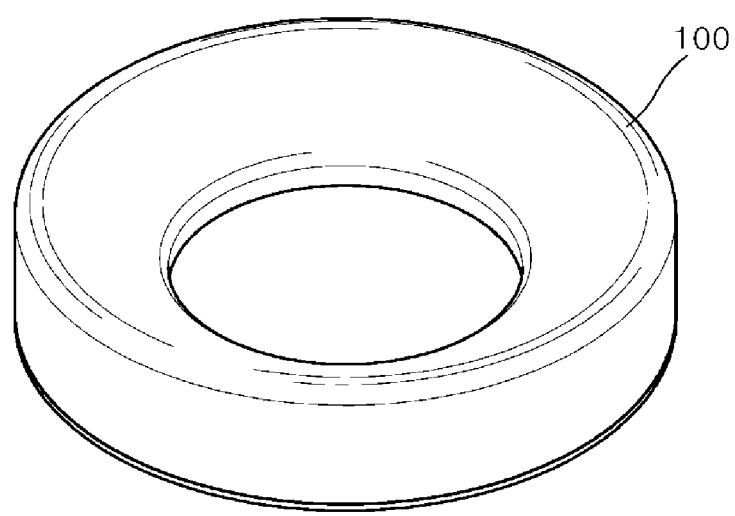
FIG. 3 is a perspective view showing an example support structure according to the present disclosure.
Figure 4:
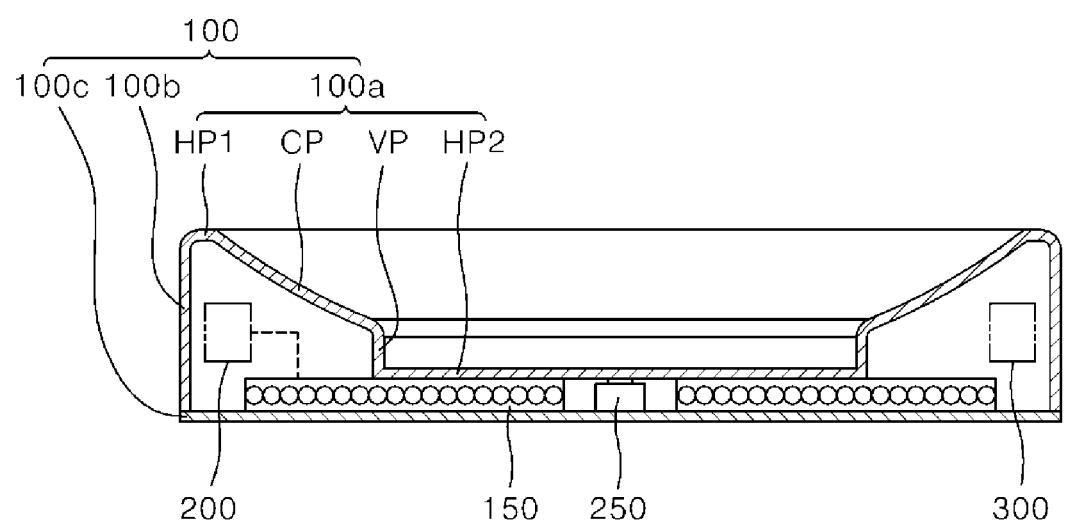
FIG. 4 is a cross-sectional view showing the support structure of FIG. 3.
Figure 5:
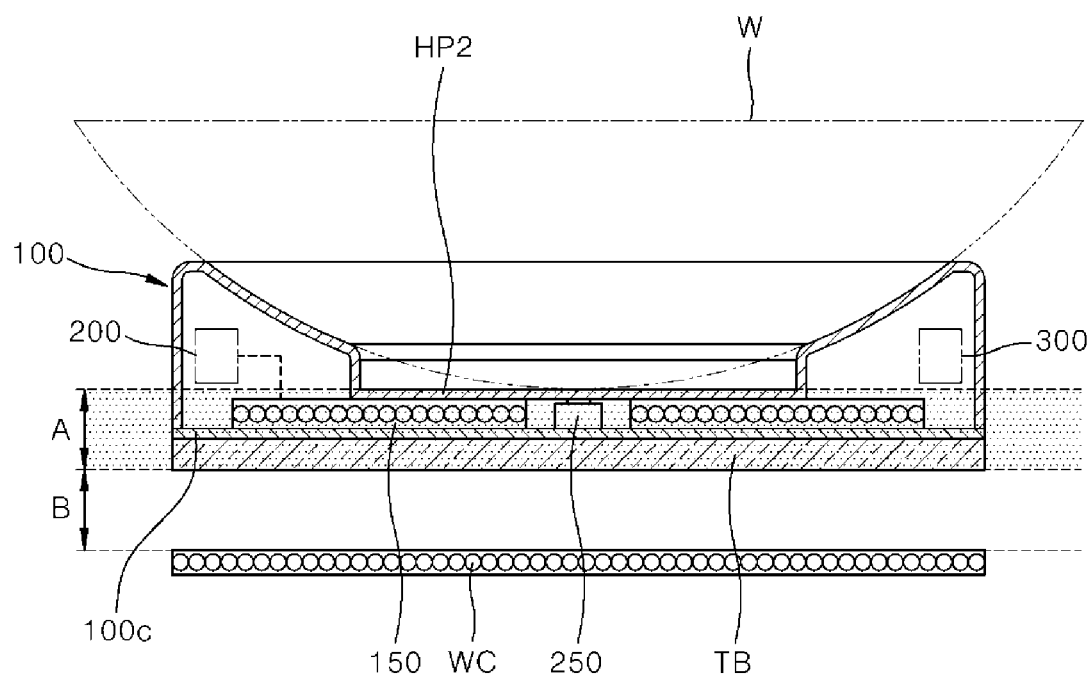
FIG. 5 is a schematic view showing an example repeating coil of the support structure of FIG. 4 and an example position of the repeating coil.
Figure 6:
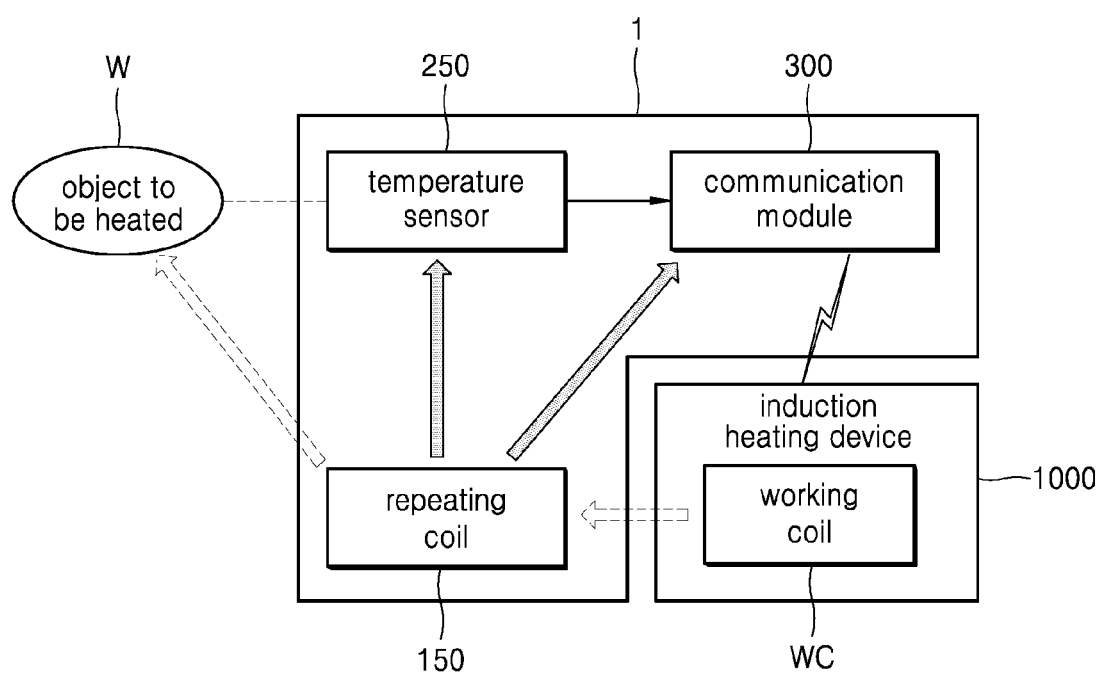
FIG. 6 is a schematic view illustrating an example control flow and an example power flow between the support structure of FIG. 3 and an example object.

FIG. 3 is a perspective view explaining an example support structure for an object that is to be heated. FIG. 4 is a cross-sectional view showing the support structure of FIG. 3. FIG. 5 is a schematic view showing an example position of a repeating coil of FIG. 4. FIG. 6 is a schematic view showing an example control flow and an example power flow between the support structure of FIG. 3 and the object.

In some implementations, a support structure 1 is driven by a working coil and associated with the working coil (WC in FIG. 6) provided in an induction heating device (1000 in FIG. 6), and a specific matter thereof will be described later.

Referring to FIGS. 3 to 5, the support structure 1 includes a housing 100, a repeating coil 150, a compensation capacitor 200, a temperature sensor 250, and a communication module 300.

An upper surface 100a of the housing 100 can be concavely recessed downward and an object to be heated W can be arranged in the upper surface 100a of the housing 100.

For example, the housing 100 may include an upper surface 100a, a side surface 100b, and a lower surface 100c. In an inside the housing 100, the repeating coil 150, the compensation capacitor 200, the temperature sensor 250, and the communication module 300 may be included.

Here, the upper surface 100a may be concavely formed downward so that the object W that to be heated. For example, the object W may be a cooking vessel such as a wok that is be stably supported as shown in FIG. 5.

In some examples, an upper surface 100a of a housing 100 may include a first horizontal portion HP1, a curved portion CP, a vertical portion VP, and a second horizontal portion HP2.

For example, the first horizontal portion HP1 is connected to the side surface 100b of the housing 100 and may be formed to extend in a horizontal direction. The curved portion CP has one end connected to the first horizontal portion HP1, and may be formed to have a curved surface. In addition, the vertical portion VP has one end connected to the other end of the curved portion CP and may be formed to extend in a vertical direction (that is, a direction orthogonal to a horizontal direction). The second horizontal portion HP2 has one end connected to the other end of the vertical portion VP, and may be formed to extend in a horizontal direction (that is, a direction parallel to the first horizontal portion HP1).

A repeating coil 150 is provided inside the housing 100 and can be driven through a magnetic induction (i.e., an electromagnetic induction) or a magnetic resonance (i.e., a magnetic resonance) with a working coil WC provided in an induction heating device.

In some implementations, the working coil WC may correspond to a primary coil that transmits a wireless power, and the repeating coil 150 may correspond to a secondary coil that receives a wireless power. In the same or other implementations, the repeating coil 150 can be driven by receiving a power through the magnetic induction or the magnetic resonance with the working coil WC.

In some implementations, as shown in FIG. 5, the repeating coil 150 may be arranged in an area between an intermediate point between the working coil WC and a lowermost end of an object to be heated W. For example, the repeating coil 150 may be arranged in an area A between a lower end of a top plate TB of the induction heating device and a lowermost end of an object W. In some cases, the area A has an area having the same size as an area B between the lower end of the top plate TB of the induction heating device and the working coil WC.

In some examples, as the distance between the repeating coil 150 and the working coil WC is closer, an energy transfer performance between two coils (that is, a coupling coefficient between the repeating coil 150 and the working coil WC becomes similar to a coupling coefficient between the working coil WC and the object W, and thus, a function of the repeating coil 150 can be degraded, which is an intermediate medium of a power transmission) can be degraded. Thus, in order to prevent this, the repeating coil 150 is arranged at the area A.

In addition, as mentioned above, the repeating coil 150 is driven through the magnetic induction or the magnetic resonance with the working coil WC, and thus, it is possible to supply the power generated based on a magnetic flux generated when driving the working coil WC to a temperature sensor 250 and a communication module 300.

In some implementations, the repeating coil 150 may be arranged between the second horizontal portion HP2 and a lower surface 100c of the housing 100 and may be arranged so as to be spaced apart from the temperature sensor 250 in a horizontal direction by a predetermined space.

A compensation capacitor 200 may be provided inside a housing 100 and may be connected to the repeating coil 150 in order to control an output of a repeating coil 150.

In some implementations, the compensation capacitor 200 may be provided inside the housing 100 by being connected to the repeating coil 150 so that it is possible to efficiently transmit an output of the induction heating device to be object to be heated.

In some cases, when a capacitance value of the compensation capacitor 200 is a half or more of a capacitance value of a resonance capacitor connected to the working coil WC, it may be difficult to effectively transmit the output of the induction heating device to the object to be heated. In such cases, the magnitude of a resonance current supplied to the working coil WC may have to be increased to provide an expected output to the object W.

In some implementations, the capacitance value of the compensation capacitor 200 is less than a half ($\frac{1}{2}$) of the capacitance value of the resonance capacitor connected to the working coil WC to effectively transmit the output of the induction heating device to the object to be heated.

In some implementations, the capacitance value of the compensation capacitor 200 may be set to be larger than or equal to a half ($\frac{1}{2}$) of the capacitance value of the resonance capacitor connected to the working coil WC. However, for convenience of explanation, it will be described by having an example that the capacitance value of the compensation capacitor 200 has a value less than a half $\frac{1}{2}$ of the capacitance value of the resonance capacitor connected to the working coil WC.

The temperature sensor 250 may be provided inside the housing 100 to sense a temperature of the object W arranged on the upper surface 100a of the housing 100.

For example, the temperature sensor 250 may be arranged at the center in the inside of the housing 100.

Here, an interval between the upper surface 100a and the lower surface 100c of the housing 100 is the narrowest at the center in the inside of the housing 100, so that the temperature sensor 250 can sense the temperature of the object W at a position adjacent to the object W.

In addition, the temperature sensor 250 may be arranged between the second horizontal portion HP2 and a lower surface 100c of a housing 100 and may be provided at the center in the inside of the housing 100 so as to be spaced apart from the repeating coil 150 in the horizontal direction by the predetermined space.

In some implementations, the temperature sensor 250 can provide information on the temperature of the object W to the communication module 300.

The communication module 300 may receive information on the temperature of the object W, which is sensed by the temperature sensor 250, and may provide information to the induction heating device 1000 (see FIG. 6) through a wireless communication.

In some implementations, the communication module 300 may provide information on the temperature of the object W to the induction heating device 1000 through the wireless communication such as Bluetooth, Zigbee, and WiFi, etc.

Here, referring to FIG. 6, a control and a power flow of an object to be heated are shown.

In some implementations, a temperature sensor 250 may sense a temperature of an object to be heated W and may provide information on a temperature to a communication module 300. In addition, the communication module 300 can provide information on the temperature of the object W supplied from the temperature sensor 250 to an induction heating device 1000 through a wireless communication.

In some implementations, the induction heating device 1000 can control an output of a working coil WC (e.g., a frequency, a phase, and a magnitude of a resonance current provided to a working coil WC) based on information on the temperature of the object W provided from the communication module 300.

That is, a support structure 1 and the induction heating device 1000 are driven associated with each other through the communication module 300 so that a temperature control efficiency of the object to be heated can be improved.

In some implementations, a repeating coil 150 receives or generates power wirelessly through a magnetic induction or a magnetic resonance with the working coil WC, and generates an eddy current to the object W by using a magnetic field generated by a received power to heat the object to be heated.

The repeating coil 150 can provide the power generated through the magnetic induction or the magnetic resonance with the working coil WC to a component (for example, the temperature sensor 250 and the communication module 300, etc.) inside the housing 100.

As mentioned above, the support structure 1 can of transmit an output of the induction heating device to the object to be heated. The user can heat an object to be heated in a special shape such as a wok as well as a general cooking vessel as intended, and furthermore, it is possible to shorten the cooking time when cooking by using the object to be cooked such as a wok.

In addition, the support structure 1 can improve a temperature control efficiency of the object to be heated through an associated driving with the induction heating device. Furthermore, when cooking by using the object to be heated, a fixed temperature control is possible, so that the taste of food can be improved.

In some implementations, when the user wishes to heat e general cooking vessel, the general cooking vessel is placed on the top plate (TB of FIG. 5) of the induction heating device without the support structure 1 and heated. In addition, when the user wishes to heat the wok, the wok is placed on the support structure 1 and heated, after arranging the support structure 1 on the top plate (TB of FIG. 5) of the induction heating de ice. Of course, the user may place the general cooking vessel on the support structure 1 and heat it.

Since various substitutions, changes, and modifications can be made within the scope that does not deviate the technical idea of this application for those skilled in the art to which this application pertains, the above-mentioned application is not limited by the above-mentioned implementations and the accompanying drawings.

What is claimed is:

1. A support structure for an induction heating device that includes a working coil configured to heat an object, the support structure comprising:
   a housing including an upper surface that is recessed downward and that is configured to seat the object;
   a repeating coil that is located inside the housing, that is configured to generate magnetic induction or magnetic resonance with the working coil, and that is configured to heat the object on the upper surface of the housing based on magnetic induction or magnetic resonance with the working coil;
   a compensation capacitor located inside the housing and connected to the repeating coil, the compensation capacitor being configured to control output of the repeating coil;
   a temperature sensor located inside the housing and configured to sense a temperature of the object on the upper surface of the housing; and
   a communication circuit located inside of the housing and configured to wirelessly communicate with the temperature sensor and the induction heating device, the communication circuit being configured to receive information regarding the temperature of the object from the temperature sensor and to provide the information to the induction heating device,
   wherein the repeating coil is arranged between a lower surface of the housing and a horizontal portion of the upper surface of the housing, the upper surface being configured to contact the object, and
   wherein the temperature sensor is arranged at a central region inside the housing and spaced apart from the repeating coil by a predetermined distance in a horizontal direction of the repeating coil.

2. The support structure of claim 1, wherein the repeating coil is arranged vertically between the working coil and a lowermost end of the object.

3. The support structure of claim 1, wherein a distance between the upper surface and the lower surface of the housing decreases toward the central region of the housing.

4. The support structure of claim 3, wherein the temperature sensor is arranged at the central region of the housing at a position that defines a minimum distance between the upper surface and the lower surface of the housing.

5. The support structure of claim 1, wherein the repeating coil is configured to supply, to the temperature sensor and to the communication circuit, power generated through the magnetic induction or the magnetic resonance with the working coil.

6. The support structure of claim 1, wherein the upper surface of the housing comprises:
   a first horizontal portion that extends in the horizontal direction with respect to the lower surface of the housing;
   a curved surface portion that has a first end connected to an end of the first horizontal portion and that is curved downward to the lower surface of the housing;
   a vertical portion that extends from a second end of the curved surface portion in a vertical direction with respect to the lower surface of the housing; and
   a second horizontal portion that extends from an end of the vertical portion in the horizontal direction with respect to the lower surface of the housing.

7. The support structure of claim 6, wherein at least a portion of the second horizontal portion is configured to be spaced apart from the object in a state in which the curved surface portion contacts a bottom surface of the object.

8. The support structure of claim 6, wherein a vertical distance between the first end of the curved surface portion and the second end of the curved surface portion is greater than a vertical distance between the second end of the curved surface portion and the second horizontal portion.

9. The support structure of claim 1, wherein the temperature sensor and the repeating coil are arranged between the upper surface of the housing and the lower surface of the housing.

10. The support structure of claim 9, wherein the repeating coil is arranged radially outward of the temperature sensor.

11. The support structure of claim 1, wherein the upper surface of the housing has a concave shape.

12. The support structure of claim 1, wherein the repeating coil is located vertically above the working coil.

13. The support structure of claim 12, wherein the upper surface of the housing is configured to contact a lowermost end of the object vertically above the repeating coil.

14. The support structure of claim 1, wherein the lower surface of the housing has a planar shape and is configured to contact a top plate of the induction heating device, the top plate being located vertically above the working coil.

15. The support structure of claim 14, wherein the repeating coil is located in a space defined between the upper surface of the housing and the lower surface of the housing.

16. The support structure of claim 15, wherein the compensation capacitor is located in the space defined between the upper surface of the housing and the lower surface of the housing.

17. The support structure of claim 15, wherein the compensation capacitor is located radially outward of the repeating coil.

18. The support structure of claim 15,
wherein the communication circuit is located in the space defined between the upper surface of the housing and the lower surface of the housing,
wherein the repeating coil is arranged radially outward of the temperature sensor, and
wherein the communication circuit is arranged radially outward of the repeating coil.

19. The support structure of claim 1, wherein the horizontal portion of the upper surface of the housing extends in the horizontal direction over the repeating coil to cover an upper portion of the repeating coil, the horizontal portion being configured to contact a lowermost end of the object.

20. A support structure for an induction heating device that includes a working coil configured to heat an object, the support structure comprising:
 a housing including an upper surface that is recessed downward and that is configured to seat the object;
 a repeating coil that is located inside the housing, that is configured to generate magnetic induction or magnetic resonance with the working coil, and that is configured to heat the object on the upper surface of the housing based on magnetic induction or magnetic resonance with the working coil;
 a compensation capacitor located inside the housing and connected to the repeating coil, the compensation capacitor being configured to control output of the repeating coil; and
 a temperature sensor located inside the housing and configured to sense a temperature of the object on the upper surface of the housing,
wherein the repeating coil is arranged between a lower surface of the housing and a horizontal portion of the upper surface of the housing, the upper surface being configured to contact the object,
wherein the temperature sensor is arranged at a central region inside the housing and spaced apart from the repeating coil by a predetermined distance in a horizontal direction of the repeating coil, and
wherein the upper surface of the housing comprises:
 a first horizontal portion that extends in the horizontal direction with respect to the lower surface of the housing,
 a curved surface portion that has a first end connected to an end of the first horizontal portion and that is curved downward to the lower surface of the housing,
 a vertical portion that extends from a second end of the curved surface portion in a vertical direction with respect to the lower surface of the housing, and
 a second horizontal portion that extends from an end of the vertical portion in the horizontal direction with respect to the lower surface of the housing.

* * * * *